United States Patent
Kato et al.

Patent Number: 5,811,952
Date of Patent: Sep. 22, 1998

[54] METHOD OF SETTING ACCELERATING/DECELERATING MOTION OF ROBOT

[75] Inventors: Tetsuaki Kato, Hadano; Atsuo Nagayama, Oshino-mura, both of Japan

[73] Assignee: Fanuc Ltd.

[21] Appl. No.: 793,584

[22] PCT Filed: Jul. 1, 1996

[86] PCT No.: PCT/JP96/01819

§ 371 Date: Feb. 28, 1997

§ 102(e) Date: Feb. 28, 1997

[87] PCT Pub. No.: WO97/01801

PCT Pub. Date: Jan. 16, 1997

[30] Foreign Application Priority Data

Jun. 29, 1995 [JP] Japan .................................. 7-185000

[51] Int. Cl.$^6$ .................................................. G05B 13/00
[52] U.S. Cl. .................... 318/568.11; 318/561; 318/566; 318/574
[58] Field of Search ........................ 318/560–579, 318/590–625, 66–68, 85, 77; 395/80, 82–84, 95–96

[56] References Cited

U.S. PATENT DOCUMENTS

| | | | |
|---|---|---|---|
| 3,665,493 | 5/1972 | Glowzewski et al. | 318/561 |
| 4,463,297 | 7/1984 | Bennett et al. | 318/561 |
| 4,518,909 | 5/1985 | Friedli et al. | 318/566 |
| 4,769,583 | 9/1988 | Goor | 318/568.18 |
| 4,973,895 | 11/1990 | Torii et al. | 318/567 |

FOREIGN PATENT DOCUMENTS

| | | |
|---|---|---|
| 0 262 600 A | 4/1988 | European Pat. Off. . |
| 0 538 483 A | 4/1993 | European Pat. Off. . |
| 4-30203 | 2/1992 | Japan . |
| 7-200033 | 8/1995 | Japan . |

*Primary Examiner*—Brian Sircus
*Attorney, Agent, or Firm*—Staas & Halsey

[57] ABSTRACT

A method of setting an accelerating/decelerating motion of a robot, in which a torque of the robot can be used efficiently without being saturated. In one section of motion, a moving ratio r representing a position which satisfies a condition such that a maximum torque is generated at a position where the maximum torque is needed, is successively and approximately obtained. First, a 0-th approximate solution (initial value) is assumed as $_ir_0=0$, and then equations of motion are calculated at the position $_ir_0$ to obtain an acceleration so as to generate the maximum torque. The position such that the torque becomes maximal when the calculated acceleration is used is obtained as $_ir_{k+1}$. The difference $|_ir_{k+1}-_ir_k|$ between the calculated $_ir_{k+1}$ and the previously calculated $_ir_k$ is calculated, and it is checked whether or not the difference exceeds a preset very small value $\epsilon$. If yes, the processing returns to S3. If no, it is determined and stored as $_irsol=_ir_{k+1}$, the index i is increased by 1 and k is cleared as k=0. If calculation for all the axes has not completed, the processing returns S1. Upon completion of calculation for all the axes, the processing proceeds to S7. In S7, the maximum of $_irsol$ is defined as rsol, an acceleration in accordance with rsol is obtained for each axis, and a condition for the accelerating motion of each axis is set.

2 Claims, 6 Drawing Sheets

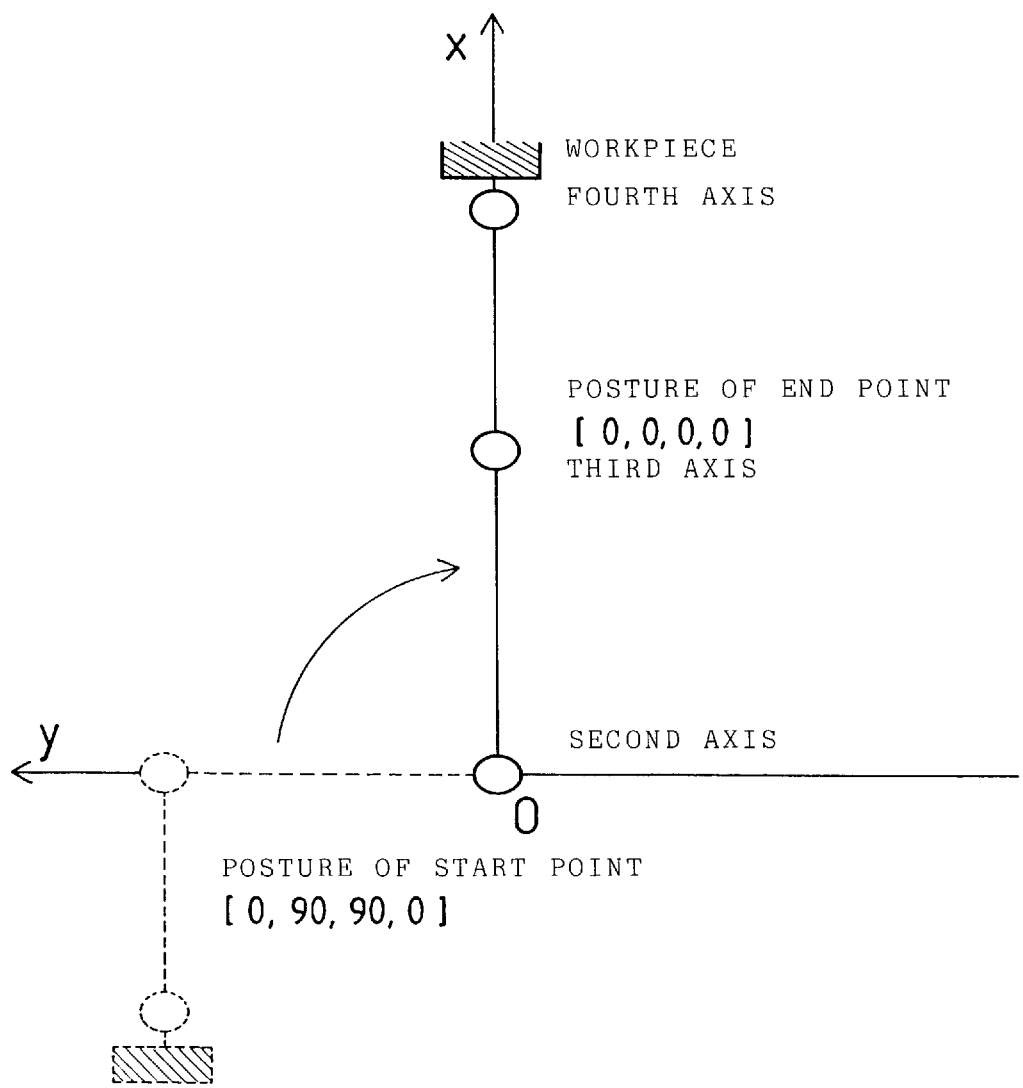

METHOD OF SETTING ACCELERATING/DECELERATING MOTION OF ROBOT

TECHNICAL FIELD

The present invention relates to a method of setting an accelerating/decelerating motion of an industrial robot, and more particularly to an accelerating/decelerating motion setting method in which the maximum acceleration is determined in planing a target track, taking dynamic characteristics of the robot into consideration.

BACKGROUND ART

It is preferable to realize an accelerating/decelerating motion for generating the maximum value of a driving torque (maximum torque) in acceleration/deceleration in order to move the robot efficiently. However, a large interference torque would act on an axis of the robot due to the inertia fluctuation and the motion of other axes during movement from its inherent structure, and the effect of dynamical friction cannot be negligible. It is therefore difficult to perform an acceleration/deceleration control as to generate the maximum torque with precision.

Thus, in the maximum acceleration controlling method which has been popularly adopted in this field of art, an interference torque has not been taken into consideration in determining the maximum acceleration of an accelerating/decelerating motion when planing the target track. Further, it has been a common practice to evaluate the effect of dynamical friction at a fixed value and set the maximum torque of a motor smaller by an amount corresponding to the fixed value.

In the foregoing conventional method, since the interference torque is not taken into consideration, the necessary torque for actual motion occasionally exceeds the maximum torque which the motor can output, or otherwise the maximum torque of the motor is not fully outputted.

In the former case (torque saturation), since the robot cannot follow a motion command, precision of the track would become worse. In the latter case, adequate performance of the robot cannot be achieved to lower the operating efficiency. Further, since the effect of dynamical friction is considered unilaterally, a torque smaller than necessary is used during deceleration.

DISCLOSURE OF INVENTION

It is an object of the present invention to provide a method of setting an accelerating/decelerating motion of a robot, in which an interference torque and effect of dynamical friction are properly taken into consideration, thereby improving the track precision and the operating efficiency.

In the present invention, a position at which a torque acting on the robot axis during accelerating or decelerating becomes maximal is estimated using a successive calculating process, and an accelerating/decelerating motion is set based on the estimated torque. Further, by considering the effect of dynamical friction in opposite directions during acceleration and deceleration, to achieve the maximum torque with more precision in the accelerating/decelerating motion.

According the present invention, a condition for the accelerating/decelerating motion is set, taking the following three conditions into account when planning a target track:

1) A constraint condition formula for each axis in order to realize the target track of the robot. Generally this formula is given as a Jacobean which defines a conversion relation between the position/posture of a tip point of a tool in an rectangular coordinate system and each axis value.

2) Motion equations of the robot, based on which the interference torque is calculated.

3) A constraint condition formula regarding the maximum torque of the robot. The effect of dynamical friction is evaluated in opposite directions in this constraint condition formula when taking the effect into consideration.

By executing the following processes A–F with respect to the accelerating and decelerating motions, a proper condition for the accelerating/decelerating motion is set.

A. A certain position in the target track is set, and an acceleration such as to generate the maximum torque is calculated based on the motion equations of the robot.

B. A position at which a command torque becomes maximal when the robot is moved (in an accelerated motion or a decelerated motion) on the target track at the acceleration is calculated.

C. Using the motion equations of the above 2), a torque is calculated based on the position of maximum command torque, a speed and the acceleration at that time. This torque contains an interference torque.

D. It is discriminated that whether or not the calculated torque substantially satisfies the condition of the above 3).

E. If the constraint condition is not satisfied, the acceleration is updated so as to satisfy the constraint condition, whereupon returning to the process B. Subsequently the process cycle of the above B–E is repeated until the condition of the above 3) is substantially satisfied.

F. If it is discriminated that the condition of the above 3) is substantially satisfied in the process of the above D, the acceleration value at that time is determined to be the acceleration for the accelerating/decelerating motion, and the accelerating/decelerating motion for the robot based on the determined acceleration. Usually, a command speed value is divided by a predetermined acceleration value to set a time constant for acceleration/deceleration control.

In the method of the invention, when planning a target track by the robot control device, an accelerating/decelerating motion is set based on a seccessive calculating process, taking into consideration a constraint condition formula for each axis to realize the target track of the robot, motion equations of the robot and a constraint condition regarding the maximum torque of each axis. Usually, the target track of the robot is determined by interpolating calculation based on operating program data, and the constraint condition formula of each axis in order to realize the determined target track is given by Jacobean. The Jacobean reflects the structure of the robot, and necessary data for calculating the value of Jacobean in each point is previously set in the robot control device.

Various parameters included in the motion equations of the robot and parameters for restricting the constraint condition regarding the maximal torque of each axis are also previously set in the robot control device.

The successive calculating process to be executed in the present invention is for approximately obtaining the maximum acceleration in such a range as not to cause a torque saturation. Once such maximum acceleration is determined, a time constant for the accelerating/decelerating motion is decided with the command speed data. By outputting a motion command with respect to each axis, which is calculated under this time constant, to the servo control system for each axis, the torque saturation is avoided even at a position where the maximum torque is necessary in the accelerating/ decelerating motion. Further, the above maximum acceleration is calculated in a critical condition such as not to case the torque saturation, which is obtained taking dynamic characteristics of the robot into consideration. Accordingly, the magnitude (absolute value) of the maximum acceleration is calculated smaller to avoid an undue extension of the operating time.

The effect of the dynamical friction to the output torque of each axis is opposite in the accelerating motion and the decelerating motion. Namely, in the accelerating motion, the dynamical friction acts in such a direction as to cancel the output torque (direction to avoid acceleration), and in the decelerating motion, it acts in such a direction as to assist the output torque (direction to promote deceleration). In the present invention, with this fact in view, the effect of dynamical friction is evaluated in opposite directions with respect to the accelerated motion and the decelerated motion, respectively, in a constraint condition regarding the maximum torque of each axis. Thereby, not only torque saturation in the accelerated motion but also extension of operation in the decelerated motion is reliably avoided.

BRIEF DESCRIPTION OF THE DRAWINGS

FIG. 8 is a diagram showing the robot motion shown in the graphs of FIGS. 7a and 7b.

BEST MODE FOR CARRYING OUT THE INVENTION

Figure 1:
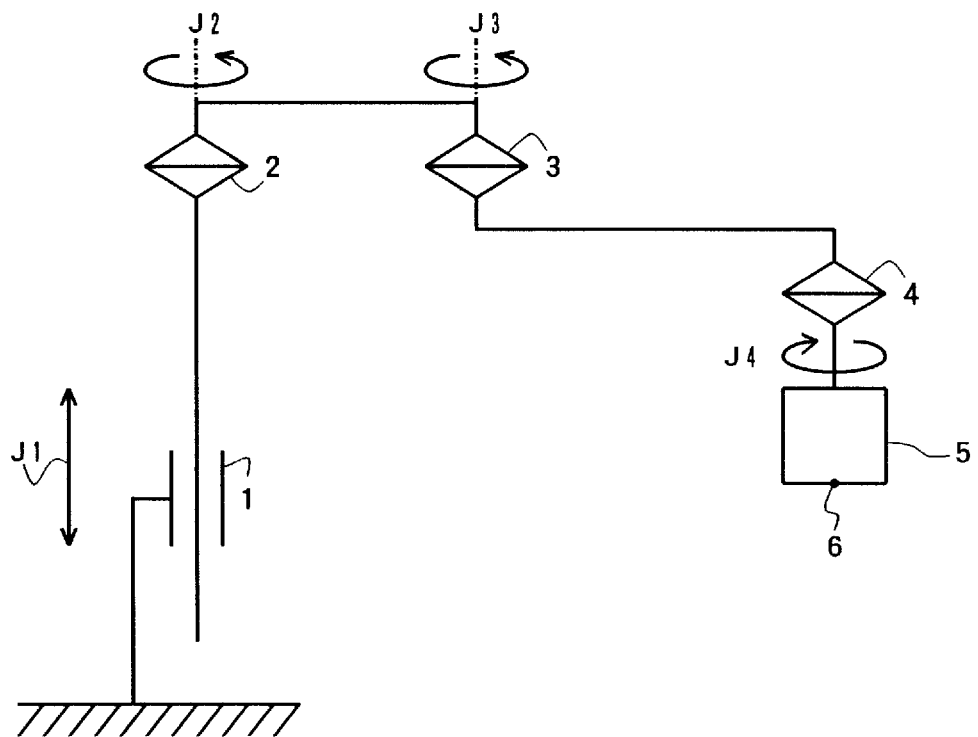
FIG. 1 is a diagram showing an axis structure of a horizontally articulated four-axis robot to which a method of the present invention is applied.

Hereinafter, it is assumed that a robot to which a method of the present invention is applied is a horizontally articulated four-axis robot as shown in FIG. 1. In FIG. 1, the horizontally articulated four-axis robot has first axis 1 to fourth axis 4 in sequence from its base. The first axis 1 is a vertically movable direct-operated axis, and the second and third axes 2, 3 are revolving axes for driving its associated link to move in a respective horizontal plane. The fourth axis 4 is an axis for rotating an end effector 5 on a hand of the robot in a horizontal plane. A reference numeral 6 represents a tip point of the tool as set at an end position of the end effector 5. The axis variables are represented by J1–J4, respectively.

In the robot having the above axis structure, the interference torque of the second to fourth axes 2–4, especially the interference torque from the third axis 3 to the second axis 2, is large. Therefore, if the accelerating/decelerating motion is set according to the conventional method, an efficiency of utilizing the torque would be worse and hence the operating time would be extended.

Figure 2:
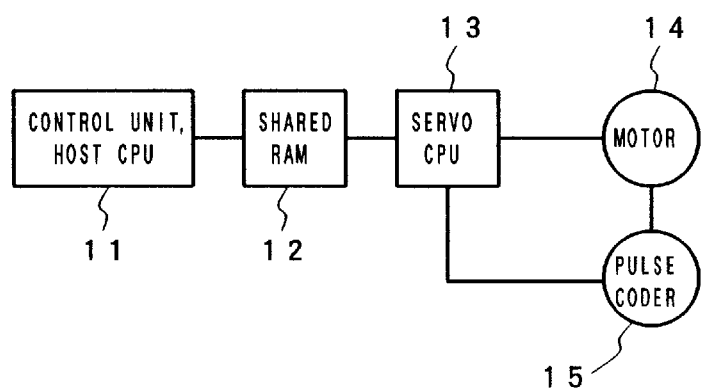
FIG. 2 is a block diagram showing an example of general structure of an ordinary system to be used for controlling a robot.

One example of general structure of an ordinary system for use in controlling the robot is shown by a block diagram of FIG. 2. As shown in FIG. 2, the whole control system comprises a host CPU 11, servo CPUs 13, a shared RAM 12 via which commands and data are transferred between the host CPU 11 and the servo CPUs 13, and motors 14, each equipped with a pulse coder 15.

Figure 3:
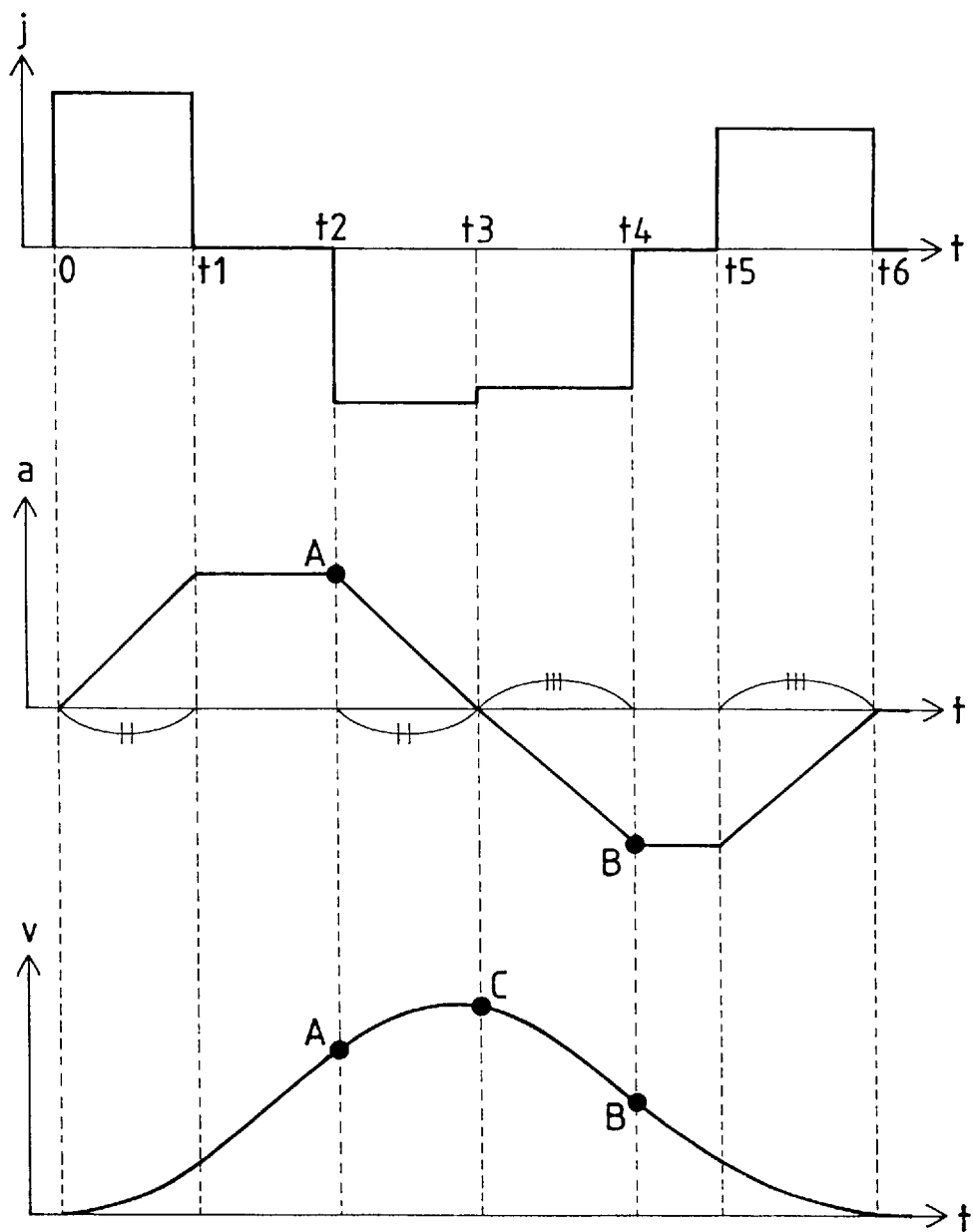
FIG. 3 shows the differentiated value j (top) of acceleration, acceleration a (center) and speed v (bottom) in a positioning movement region to which the accelerating/decelerating motion is set in the embodiment, using a common time axis (of abscissa)

The manner in which the accelerating/decelerating motion is set according to the method of the present invention will be described, additionally referring to FIG. 3. FIG. 3 shows respective profiles of differentiated value j (top) of the acceleration, the acceleration a (center) and the speed v (bottom), in a section of positioning motion for which the accelerating/decelerating motion is to be set according to this embodiment, as charts using a common time axis (of abscissa). In this embodiment, the motion is set under the following assumptions I–IV. The settings necessary to establish these assumptions are regarded to have been completed along with the settings of other parameters necessary to execute the process.

Assumption I: The ratio of acceleration and deceleration is constant. Thus, the profile of the differentiated value of acceleration is given by a pattern shown in the top chart of FIG. 3, in which $t1:t2-t1:t3-t2$=constant, and $t4-t3:t5-t4:t6-t5$=constant. Under this assumption, the profile of each of the acceleration a and the speed v is given in a pattern shown in the central and bottom charts, respectively, in FIG. 3. In case of a long motion, the profile of the speed v has a plateau area (area where the command speed is maintained) instead of the peak C.

Figure 4:
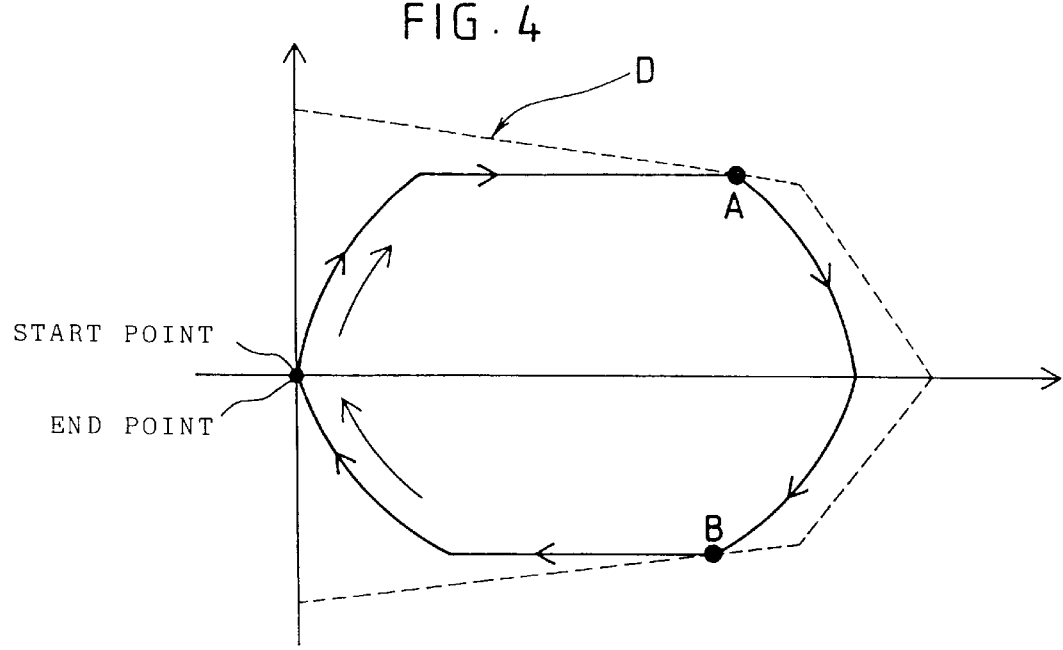
FIG. 4 is a graph showing transition of a relation between the speed and the torque from a start point to an end point.

Assumption II: Under the assumption I, the point at which the torque becomes maximal is a point A (point at which the acceleration begins to lower from the highest acceleration value). Thus, it is assumed that the maximum torque output is required at the point where the speed becomes maximal on condition of the maximal acceleration. This means that even under the same acceleration, the higher the speed, the larger the torque is usually required due to the effect of dynamical friction of a speed reducer, etc. Taking this assumption, the transaction of a relation between the speed and the torque from the start point to the end point is represented by a loop as shown in FIG. 4. In this figure, reference character D designates a characteristic curve (torque curve) of the maximum torque of the motor itself, and this curve comes in contact with the loop at the point A.

Assumption III: The robot takes respective-axis motion.

Assumption IV: The robot moves on a commanded track. This means that when a start point and an end point are given, every position during movement is calculated by the system using the ratio r with respect to the entire amount of movement. Thus, the position of an arbitrary point during movement is given by the following equation (1):

$$q=qs+r(qd-qs) \qquad (1)$$

where each axis position of the start point is qs and each axis position of the end point is qd.

Generally, the basic flow of the process for moving the robot is as follows:

i) A process for determining positions of a start point, an end point and a command speed. This process is executed by the host CPU 11 based on program data.

ii) A process for determining an acceleration in accordance with the motion designated by the process i). This process contains the innate technical concept of the present invention and is performed by the host CPU 11 of the system as shown in FIG. 2.

iii) A process for executing the motion of the robot. In this process, a motion command is transferred from the host CPU 11 to the servo CPU 13 of each axis via the shared RAM 12, and the motor 14 is controlled based on the motion command. An output signal of the pulse coder 15 is used for generating a feedback signal for the position loop and a speed loop.

Since the processes of i) and iii) above are well known in the art, their detailed description is omitted here and only the items relating process of ii) above, which contains the innate technical concept of the present invention. In the present invention, accelerating/decelerating motion is set so as to sufficiently utilize a motor torque by taking into consideration the dynamical characteristics of the robot in the process ii) for determining the acceleration. The acceleration determining process in this embodiment will be described below in detail.

[Way of Determining Acceleration Taking Dynamical Characteristics into Consideration]

There are two conditions relating to the torque during movement. These are a torque $\tau i$ and a maximum torque $\tau maxi$ acting on the i-th axis of the robot, which are expressed by the following equations (2) and (3):

$$\tau i = M i(q) \ddot{q} + h i(q, \dot{q}) \tag{2}$$

$$\tau maxi = g i(vi) - sgn(\dot{v}i) \mu i \, |vi| \tag{3}$$

First, the equation (2) is a condition formula which is obtained from equation of motion of the robot and the ordinary dynamical characteristics of the robot is described by this equation. The definition and detailed content of various symbols used in the equation will be described later in the auxiliary description.

From the assumption II, the equation (2) is expressed by the following equation (4) with regard to the point A in FIG. 3.

$$\tau i_a = M i(qa) \ddot{q} a + h i(qa, \dot{q} a) \tag{4}$$

where qa is a position corresponding to the point A. Since a command speed Vcmd is known, qa is determined by the following equation (5) from the assumptions I, II and III (thus, qa is a known constant value). t1 and t2 are time values in FIG. 3. $\ddot{q}$a is determined by the following equation (6) using qa and $\dot{q}$a.

$$\dot{q}a = Vcmd\left(1.0 - \frac{t1}{2t2}\right) \tag{5}$$

$$\ddot{q}a = \frac{\tau i_a - h i(qa, \dot{q}a)}{M i(qa)} \tag{6}$$

Thus, the condition formula is expressed in terms of only qa. Further, the following equation (7) is obtained from the equation (1), with ra which represents a ratio between the whole moving amount and a moving amount from the start point qs to a position corresponding to the point A.

$$qa = qs + ra(qd - qs) \tag{7}$$

In view of the above, the condition formula (4) is regarded as an equation relating to only the moving ratio ra and can be expressed by the following equation (8):

$$\tau i_a = f i(ra) \tag{8}$$

With regard to the second condition formula (3), this formula is composed of a term of speed/torque curve of the motor and a term of the dynamical friction. gi(vi) of the first term is a function representing a characteristic curve of the maximum torque of the motor itself, which corresponds to reference character D as shown in FIG. 4. vi is a motor speed which is obtained by dividing $\dot{q}$i by a reduction ratio.

sgn($\dot{v}$i)$\mu$i |vi| of the second term represents a dynamical friction. sgn(vi) defines a direction in which the friction acts, and $\mu$i |vi| defines a magnitude of the friction. $\mu$i is a dynamical friction coefficient of the i-th axis, |vi| is an absolute value of the motor speed. This term functions to prevent acceleration of the motor and assist deceleration of the motor. In the same manner as the condition formula (3), the following equation (9) is obtained with regard to the point A in FIG. 3 on the assumption II.

$$\tau maxi_a = g(vi_a) - sgn(\dot{v}i_a)\mu i |vi_a| \tag{9}$$

where $\tau maxi_a$ is the maximum torque at the point A, and $vi_a$ is a motor speed at the point A. $vi_a$ is a known constant value like $\dot{q}$a.

It is understood from the foregoing consideration that it is only necessary to obtain the moving ratio ra which satisfies the following equation (10) (a full-ability torque of the motor is produced at the point A where the maximum torque is required, as shown in FIG. 4).

$$\tau i_a - \tau maxi_a \equiv f i'(ra) = 0 \tag{10}$$

[Calculating Process for Obtaining ra Satisfying Equation (10)]

Figure 5:
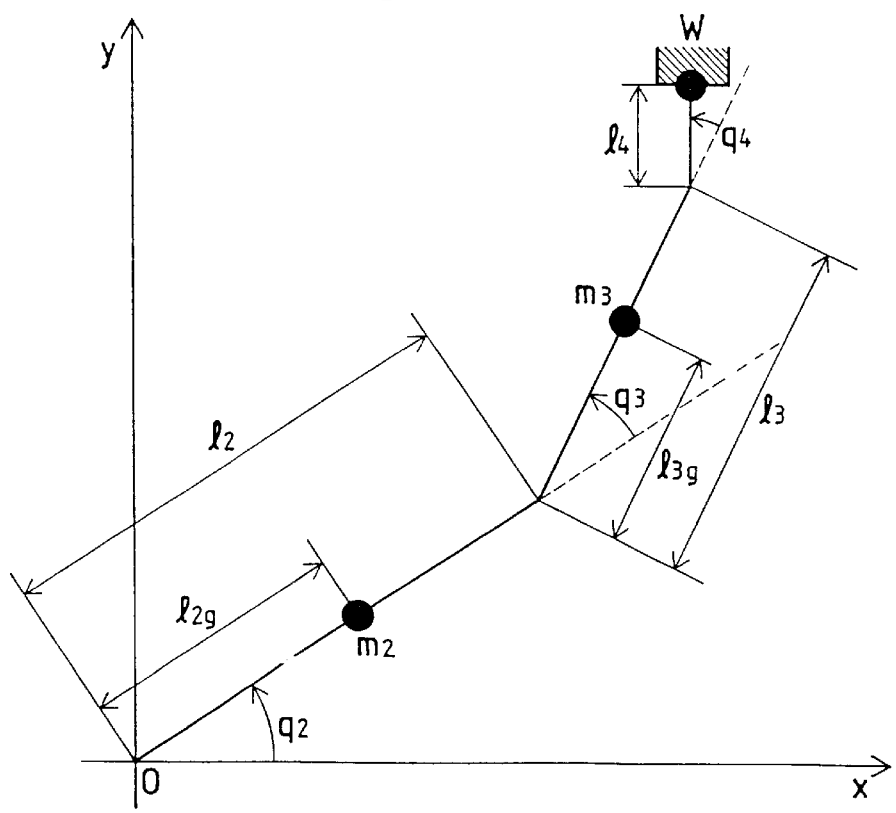
FIG. 5 is a diagram illustrating axis variables and structural parameters of the horizontally articulated four-axis robot to which the method of the present invention is applied.
Figure 6:
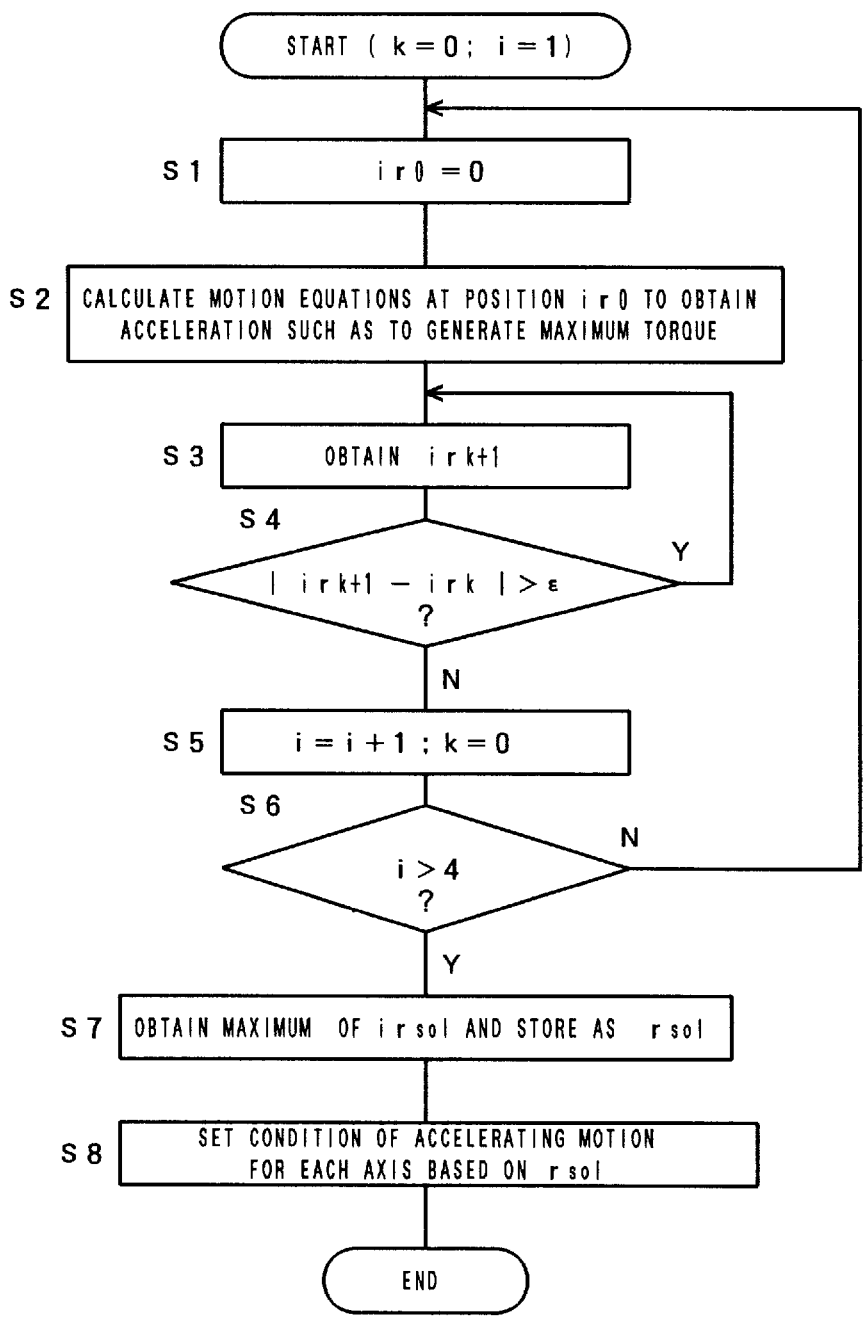
FIG. 6 is a flowchart showing a process to be executed in the embodiment.

In order to obtain ra=rsol satisfying the equation (10), an approximate computing process comprising the following procedures is executed. This computing process is shown in the flowchart of FIG. 5. The k-th approximate value (k=0, 1, 2, . . . ) of rsol with respect to the i-th axis represented by the index i is represented by $_i r_k$ (the initial value k=0; the initial value of the index i=1, the maximum value of the index i=4 in the robot of FIG. 1).

Step S1: The 0-th approximate solution (initial value) is set as $_i r_0 = 0$ (however, it may be set to a different value).

Step S2: The equation of motion is calculated at the position $_i r_0$ and the acceleration is determined so as to generate the maximum torque. The calculating equation is given by the following equation (11):

$$\ddot{q}1 = \frac{\tau i max_a - h(qo, \dot{q}a)}{M(qo)} \tag{11}$$

Step S3: A position where the torque is maximum with the calculated acceleration is obtained as $_i r_{k+1}$. The theoretical calculating equation is given by the following equation (12) and an actual calculating process is expressed by the following equation (13) using the difference calculus.

$$_i r_{k+1} = {_i r_k} - \left\{\frac{\partial f'(_i r_k)}{\partial r}\right\}^{-1} f'(_i r_k) \tag{12}$$

$$_i r_{k+1} = {_i r_k} - \frac{_i r_k - {_i r_{k-1}}}{f'(_i r_k) - f'(_i r_k)} f'(_i r_k) \tag{13}$$

Step S4: The difference $|_i r_{k+1} - {_i r_k}|$ between the calculated $_i r_{k+1}$ and the previously calculated $_i r_k$ is calculated, and it is determined whether or not this difference exceeds a preset very small value e (e.g., $\epsilon=0.01$; the error 1% of the whole length of the movement). If yes, the processing returns to Step S3, and if no, $_i$rsol is stored as $_i$rsol=$_i r_{k+1}$ and the processing proceeds to Step S5.

Step S5: The index i is increased by 1, and k is cleared as k=0.

Step S6: If calculation for all the axes has not been completed, the processing returns to Step S1. If calculation for all the axes has been completed, the processing proceeds to Step S7.

Step S7: The maximum one of $_i$rsol (i=1, 2, 3, 4) is stored as rsol.

Step S8: An acceleration in accordance with rsol is obtained for every axis, and the condition of the accelerating/decelerating motion is set for each axis (a time constant for acceleration control). With the foregoing processes, the position of the point A on the time axis in FIG. 4 and the maximum acceleration (the position of the point A on the axis of ordinate) in the acceleration profile (central chart) are determined. By performing the similar processes with respect to the point B instead of the point A in the foregoing description, the condition of the accelerating motion for each axis can be set. At that time, the effect of dynamical friction is evaluated in a direction opposite to that in the acceleration in accordance with a definition of the condition formula (3) regarding the maximum torque, and an absolute value of the acceleration is set to be slightly larger than conventional.

Figure 7A:
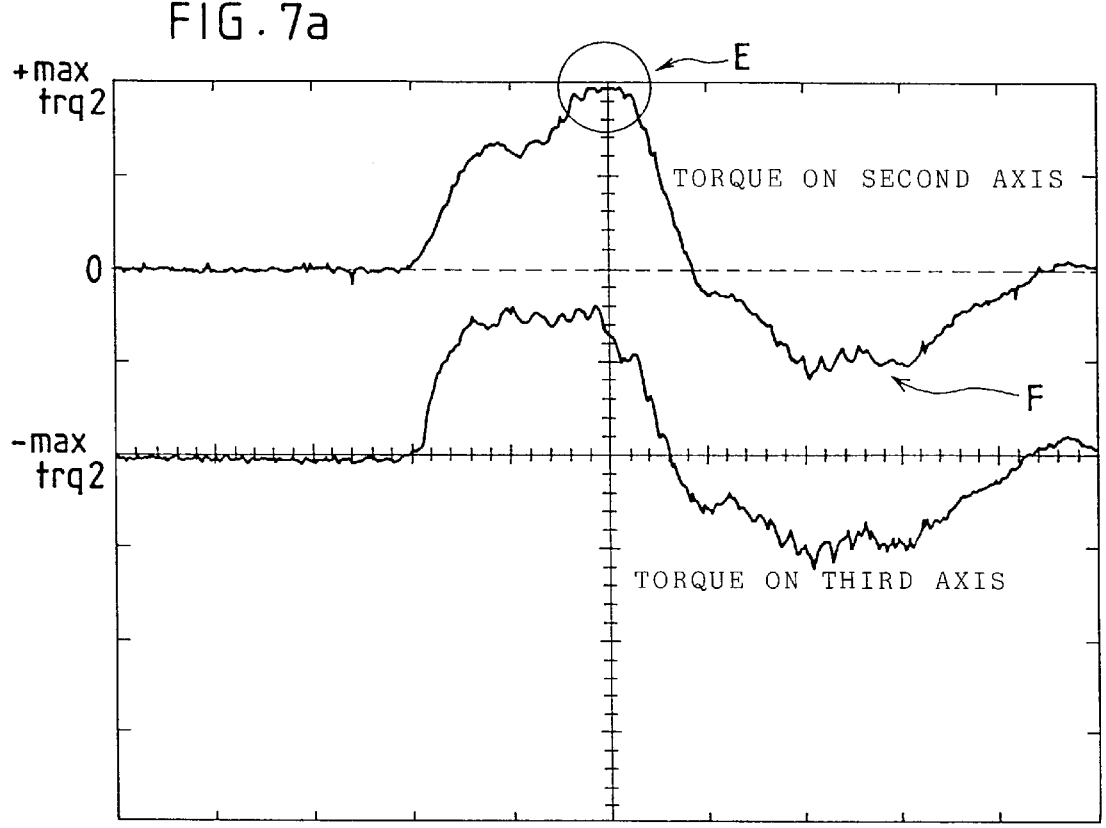
FIGS. 7a and 7b are graphs showing the results when the robot having the axis structure shown in FIG. 1 is operated according to the conventional method and the method of the present invention, respectively.
Figure 7B:
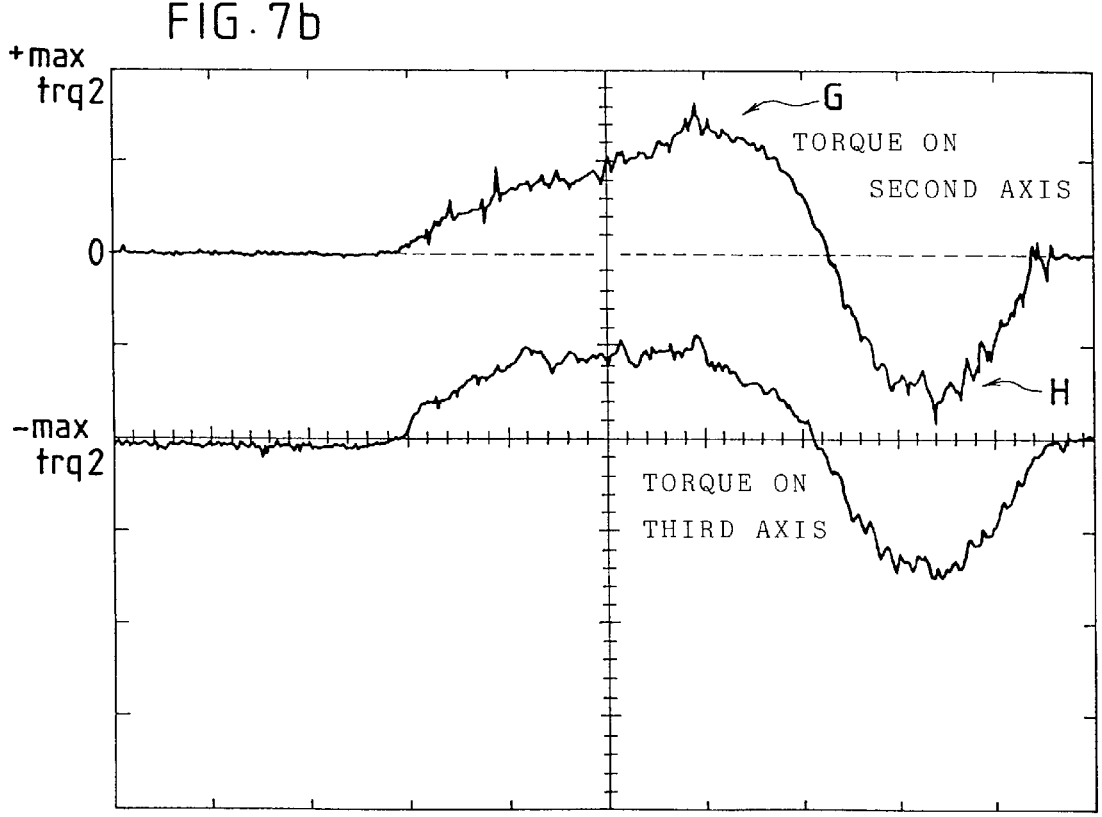

The result of application of the method of the present invention to the actual robot having the axis structure of FIG. 1 will be described referring to the graphs of FIGS. 7a and 7b, comparing with the result according to the conventional method. In each graph, individual torques acting on the second axis and the third axis (the axes on which the interference torque is not negligible) are shown. The robot motion is set as shown in FIG. 8. In either graph, the axis of abscissa represents time. The maximum torque on the second axis is shown as ±maxtrq2.

With regard to the second axis, as the interference torque due to the motion of the third and fourth axes (particularly the third axis) acts greatly on the second axis in this motion, a saturation of torque is observed in the conventional method, as indicated by a reference character E.

Further, in the conventional method, since dynamical friction is not taken into consideration, the torque during deceleration is smaller than that during acceleration, as indicated by a reference character F. Contrary, since interference torque are taken into consideration in the method of the present invention, the torque during acceleration is slightly reduced as compared with the conventional method, so that the saturation of torque is avoided, as indicated by a reference character G. Furthermore, according to the method of the present invention, since the dynamical friction is taken into consideration, the torque during deceleration is also used effectively, as indicated by a reference character H.

As a result, in the case where the method of the present invention is applied, the maximum torque during acceleration and the maximum torque during deceleration are substantially the same, and therefore it may be said that a well balanced torque is generated with respect to the acceleration and deceleration. At that time, the whole operating time is not extended but rather tends to shortened as compared with the conventional method. Thus, according to the present invention, an efficient use of torque is realized for the entire accelerating/decelerating motion without problems.

[Auxiliary Description Relating to Motion Equations]

The motion equations with respect to the second to fourth axes of the horizontally-articulated four-axis robot as shown in the embodiment of FIG. 1 are given by the following equations (14)–(19), and the individual coefficients are given by the following equations (20)–(40).

$$\tau_2 = a_{22}\ddot{q}2 + a_{23}\ddot{q}3 + a_{24}\ddot{q}4 - b_{233}\dot{q}3^2 - \\ b_{244}\dot{q}4^2 - b_{223}\dot{q}2\dot{q}3 - b_{234}\dot{q}3\dot{q}4 - b_{242}\dot{q}4\dot{q}2 \quad (14)$$

$$= M2(q)\ddot{q} + h2(q, \dot{q}) \quad (15)$$

$$\tau_3 = a_{32}\ddot{q}2 + a_{33}\ddot{q}3 + a_{34}\ddot{q}4 - b_{322}\dot{q}2^2 - b_{344}\dot{q}4^2 - \\ b_{334}\dot{q}3\dot{q}4 - b_{342}\dot{q}4\dot{q}2 \quad (16)$$

$$= M3(q)\ddot{q} + h3(q, \dot{q}) \quad (17)$$

$$\tau_4 = a_{42}\ddot{q}2 + a_{43}\ddot{q}3 + a_{44}\ddot{q}4 - b_{422}\dot{q}2^2 - \\ b_{433}\dot{q}3^2 - b_{423}\dot{q}2\dot{q}3 \quad (18)$$

$$= M4(q)\ddot{q} + h4(q, \dot{q}) \quad (19)$$

$$a_{22} = m_2 + m_3(l_2^2 + l_{3g}^2 + 2l_2l_{3g}C_3) + \\ W(l_2^2 + l_3^2 + 2l_4^2 + 2l_2l_3C_3 + 2l_3l_4C_4 + 2l_4l_2C_{34} + l_2) \quad (20)$$

$$a_{23} = m_3(l_{3g}^2 + l_2l_{2g}C_2) + \\ W(l_3^2 + l_4^2 + l_2l_3C_3 + 2l_3l_4C_4 + l_4l_2C34 + I_3) \quad (21)$$

$$a_{24} = W(l_4^2 + l_3l_4C4 + l_4l_2C_{34} + I_4) \quad (22)$$

$$b_{233} = m_3l_2l_{3g}S_3 + W(l_2l_3S_3 + l_4l_2S_{34}) \quad (23)$$

$$b_{244} = W(l_3l_4S4 + l_4l_2S_{34}) \quad (24)$$

$$b_{223} = 2(m_3l_1l_{2g}S_2 + W(l_2l_3S_3 + l_4l_2S_{34})) \quad (25)$$

$$b_{234} = 2W(l_3l_4S_4 + l_4l_2S_{34}) \quad (26)$$

$$b_{242} = b_{234} \quad (27)$$

$$a_{32} = a_{23} \quad (28)$$

$$a_{33} = m_3l_{3g}^2 + W(l_3^2 + l_4^2 + 2l_3l_4C_4) + I_3 \quad (29)$$

$$a_{34} = W(l_4^3 + l_3l_4C_4) + I_4 \quad (30)$$

$$b_{322} = m_3l_2l_{3g}S_3 + W(l_2l_3S_3 + l_4l_2S_{34}) \quad (31)$$

$$b_{344} = Wl_3l_4S_4 \quad (32)$$

$$b_{334} = 2b_{344} \quad (33)$$

$$b_{342} = b_{334} \quad (34)$$

$$a_{42} = W(l_4^2 + l_3l_4C_4 + l_4l_2C_{34} + I_2) \quad (35)$$

$$a_{43} = W(l_4^2 + l_3l_4C_4 + I_3) \quad (36)$$

$$a_{44} = Wl_4^2 \quad (37)$$

$$b_{422} = W(l_3l_4S_4 + l_4l_2S_{34}) \quad (38)$$

$$b_{433} = Wl_3l_4S_4 \quad (39)$$

$$b_{423} = 2b_{433} \quad (40)$$

$\tau_2$–$\tau_4$ represent the torque acting on the second to fourth axes, respectively. Ci, Si, Ci+j, Si+j represent cos(qi), sin (qi), cos(qi+j), sin(qi+j), respectively. The axis variables and structure parameters are shown in FIG. 5. Namely, $m_i$ represents a mass of the i-th link, $l_i$ represents a link length of the i-th link, $l_{ig}$ represents a distance from the center of rotation of the i-th axis to the center of gravity of the i-th link, and $I_i$ represents inertia of the i-th link about the center of rotation of the i-th axis. Further, W represents a mass of the end effector supported on the robot. Using these equations of motion, it is possible to calculate the torque on each axis when the position, speed and acceleration of each axis are determined.

As is apparent from the results shown in FIG. 7, according to the present invention, there is provided an accelerating/decelerating motion setting method in which an interference torque and an effect of the dynamical friction is properly taken into consideration, to thereby improve the tracking precision and operating efficiency of the robot.

We claim:

1. A method of setting an accelerating/decelerating motion of a robot, based on a constraint condition for each of robot axes to realize a target track of the robot when defining a track plan in a control device of the robot, motion equations of the robot and a sequential computing process considering the constraint condition relating to a maximum torque of each robot axis, said sequential computing process comprising the steps of:

(a) setting a position on the target track and calculating an acceleration so as to generate the maximum torque, based on equations of motion of the robot;

(b) calculating a position of maximum command torque in which a command torque becomes maximal when the robot is moved on the target track at said acceleration;

(c) calculating a torque including an interference torque, based on the position of maximum command torque, a speed and the acceleration at that time, using the equations of motion of the robot;

(d) discriminating whether or not the calculated torque substantially satisfies the constraint condition with respect to the maximum torque of each axis;

(e) updating the acceleration so as to satisfy the constraint condition and returning to said step (b) when it is discriminated that the constraint condition is substantially not satisfied in said step (d); and (f) defining the acceleration when it is discriminated that the constraint condition is substantially satisfied in said step (d) for the acceleration for the accelerating/ decelerating motion and setting the accelerating/ decelerating motion for the robot based on the defined acceleration;

said steps (b) through (e) being repeatedly executed until it is discriminated that the constraint condition is substantially satisfied in said step (d).

2. A method of setting an accelerating/decelerating motion of a robot according to claim 1, wherein said constraint condition regarding the maximum torque of said each axis includes a condition of evaluating an effect of dynamical friction in opposite directions with respect to the accelerating and decelerating motions.

* * * * *

UNITED STATES PATENT AND TRADEMARK OFFICE
CERTIFICATE OF CORRECTION

PATENT NO. : 5,811,952
DATED : September 22, 1998
INVENTOR(S) : Kato et al.

It is certified that error appears in the above-identified patent and that said Letters Patent is hereby corrected as shown below:

Title Page, [73], Assignee, after "Fanuc Ltd." insert --Yamanashi, Japan--.

Title Page, [57] ABSTRACT, line 19, after "returns" insert --to--.

Col. 5, line 15, after "relating" insert --to the--.

Col. 6, line 64, "value e" should be --value $\epsilon$--.

Col. 8, line 18, "$21_4^2$" should be --$1_4^2$--.

Signed and Sealed this

Thirteenth Day of July, 1999

Attest:

Attesting Officer

Q. TODD DICKINSON

Acting Commissioner of Patents and Trademarks